United States Patent
Hamadi et al.

(10) Patent No.: US 7,315,727 B2
(45) Date of Patent: Jan. 1, 2008

(54) METHODS AND APPARATUSES FOR COMMUNICATING WITH WIRELESS PERIPHERAL DEVICES

(75) Inventors: Charles Jamile Hamadi, Roswell, GA (US); Stephen Emille Chin, Norcross, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 553 days.

(21) Appl. No.: 10/685,159

(22) Filed: Oct. 14, 2003

(65) Prior Publication Data

US 2005/0078645 A1 Apr. 14, 2005

(51) Int. Cl.
*H04B 7/00* (2006.01)
(52) U.S. Cl. ................. 455/41.2; 455/419; 455/420
(58) Field of Classification Search ............... 455/41.2, 455/556.1, 418, 419, 420

See application file for complete search history.

(56) References Cited

U.S. PATENT DOCUMENTS

| | | | |
|---|---|---|---|
| 6,529,729 B1 | 3/2003 | Nodoushani et al. | |
| 6,546,243 B2 | 4/2003 | Tiedemann, Jr. | |
| 6,879,600 B1* | 4/2005 | Jones et al. | 370/466 |
| 2002/0159434 A1* | 10/2002 | Gosior et al. | 370/350 |
| 2004/0076136 A1* | 4/2004 | Beach | 370/338 |
| 2004/0152457 A1* | 8/2004 | Goldstein et al. | 455/419 |
| 2004/0203388 A1* | 10/2004 | Henry et al. | 455/41.2 |

* cited by examiner

*Primary Examiner*—Sanh D. Phu
(74) *Attorney, Agent, or Firm*—Coulter Henry Parks Knowlton LLC; Paul E. Knowlton, Esq.

(57) ABSTRACT

Methods and apparatuses are disclosed for communicating with wireless peripheral devices. One method receives a communication for the wireless peripheral device. Wireless signals, such as activation, initialization, or registration signals/messages, are communicated to the wireless peripheral device utilizing more than one wireless technology standard. When the wireless peripheral device responds, the communication is forwarded to the wireless peripheral device using a single wireless technology standard.

10 Claims, 17 Drawing Sheets

METHODS AND APPARATUSES FOR COMMUNICATING WITH WIRELESS PERIPHERAL DEVICES

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND OF THE INVENTION

1. Field of the Invention

This invention generally relates to computers and to telecommunications and, more particularly, to communication with peripheral devices in wireless networks and in radio telephone systems.

2. Description of the Related Art

Some communications devices operate in multiple networks. A "dual-mode" GSM-ANSI Interoperability Team (GAIT) device, for example, operates in both a TDMA communications network and in a GSM communications network. A true "world phone" could similarly operate in a CDMA, a TDMA, and/or a GSM communications network. These multiple-mode devices can send and receive communications regardless of the signaling standard. Until a single, worldwide signaling standard is adopted, communications devices that can operate in multiple networks are expected to grow in popularity.

Although a communications device may operate in multiple networks, the communications device must first be located. That is, the communications device is forced to activate in a particular network using a particular signaling standard. The communications device, for example, may have internal settings and programming that only permit activation and registration in a home TDMA network. A mobile telecommunications service provider controls the operating environment of the communications device to only permit activation in a known location. Once the communications device is found, communications to and from the communications device are processed.

Multiple network communications devices, however, create complexities and concerns for mobile telecommunications service providers. Some mobile telecommunications service providers program a Subscriber Identity Module (SIM) to only register in the subscriber's home network. A subscriber in Los Angeles, for example, may have a different home network than a subscriber in Boston. Because each subscriber may have a different home network, multiple SIM designs are required for each market. When multiple SIM designs are required, engineering, purchasing, manufacturing, and inventory operations are complex and expensive.

There is, accordingly, a need in the art for improved multiple network communications devices and methods, a need for improved activation of communications devices in a multiple network environment, and a need for improved activation and registration of communications devices that reduces the complexity and expense of multiple Subscriber Identity Modules.

BRIEF SUMMARY OF THE INVENTION

The aforementioned problems, and other problems, are reduced by methods and systems for communicating with wireless peripheral devices. This invention communicates wireless signals to a wireless peripheral device utilizing multiple wireless technology standards. Because multiple wireless technology standards are utilized, this invention need not first find the wireless peripheral device. These wireless signals may be any type of signals, and may have any content, yet the wireless signals are most commonly initialization, registration, and/or activation messages/instructions. This invention wirelessly communicates these wireless signals in multiple formats and/or technology standards and awaits an acknowledgement. When the acknowledgment is received, the acknowledgement preferably identifies the format and/or technology standard preferred/utilized by the wireless peripheral device. Future communications to the wireless peripheral device may then be wirelessly communicated using the format and/or technology standard identified in the acknowledgment.

This invention may be applied to any wireless device and any wireless network. This invention may be utilized in a wireless computer network and/or in a wireless communications network. A wireless printer, for example, may be addressed, initialized, and/or activated utilizing multiple wireless technology standards. This invention could communicate I.E.E.E 802 wireless signals, radio frequency (RF) signals, Industrial, Scientific, and Medical (ISM) band signals, infrared (IR) signals, and/or any other frequency of signals to the printer. If the printer acknowledges receipt of the signals, the acknowledgement could identify the wireless technology standard preferred, or currently utilized, by the printer. Future messages, files, and other data could then be communicated utilizing the wireless technology standard identified in the acknowledgment. This invention, as another example, could activate/register a cellular phone utilizing multiple wireless technology standards, such as the GSM, TDMA, and CDMA wireless technology standards. If the cellular phone acknowledges, the acknowledgement would identify the wireless technology standard in which the cellular phone is currently registered. Many other examples are provided within this patent. This invention, then, allows any wireless network to communicate with any type of wireless peripheral device.

This invention discloses methods and apparatuses for communicating with wireless peripheral devices. The wireless peripheral device may include a printer, a memory/storage device, a communications device, and/or a computer. The communications device may include a satellite/cellular/wireless telephone, a personal digital assistant (PDA), a pager, an interactive television unit, a digital music device, a digital camera, a wireless key fob, a wireless remote control, or any other device capable of receiving wireless communications. One method receives a communication for the wireless peripheral device. Wireless signals, such as activation, initialization, or registration signals/messages, are communicated to the wireless peripheral device utilizing more than one wireless technology standard. When the wireless peripheral device responds, the communication is forwarded to the wireless peripheral device using a single wireless technology standard.

Another of the embodiments of this invention describes another method for communicating with wireless peripheral devices. Here a communication for the wireless peripheral device is received at a computer device. Multiple wireless systems are then instructed to communicate wireless signals to the wireless peripheral device. An example of these wireless signals includes activation, initialization, and/or registration signals/messages. The multiple wireless systems utilize multiple wireless technology standards, such as the GSM, TDMA, and CDMA wireless technology standards.

The communication is then forwarded to the wireless peripheral device using a single wireless technology standard.

Yet another of the embodiments of this invention describes a method for terminating a message to a wireless peripheral device. The message is received and multiple message service centers are instructed to communicate an activation message to the wireless peripheral device. The multiple message service centers utilize at least two of i) a Global System for Mobile (GSM) communications technology standard, ii) a Time Division Multiple Access (TDMA) communications technology standard, iii) a Code Division Multiple Access (CDMA) communications technology standard, iv) a GSM-ANSI Interoperability Team (GAIT) communications technology standard, and v) a combination of the Global System for Mobile (GSM) communications technology standard and the Code Division Multiple Access (CDMA) communications technology standard. The communication is then forwarded to the wireless peripheral device using a single wireless technology standard.

BRIEF DESCRIPTION OF THE SEVERAL VIEWS OF THE DRAWINGS

These and other features, aspects, and advantages of this invention are better understood when the following Detailed Description of the Invention is read with reference to the accompanying drawings, wherein.

DETAILED DESCRIPTION OF THE INVENTION

This invention now will be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

This invention communicates wireless signals to a wireless peripheral device utilizing multiple wireless technology standards. Because multiple wireless technology standards are utilized, this invention need not first find the wireless peripheral device. This invention wirelessly communicates these wireless signals in multiple formats and/or technology standards and, preferably, awaits an acknowledgement. When the acknowledgment is received, the acknowledgement preferably identifies the format and/or technology standard preferred/utilized by the wireless peripheral device. Future communications to the wireless peripheral device may then be wirelessly communicated using the format and/or technology standard identified in the acknowledgment. Should the wireless peripheral device change the preferred/utilized format and/or technology standard, this invention simply communicates more wireless signals in multiple formats and/or technology standards and awaits another acknowledgement.

Figure 1:
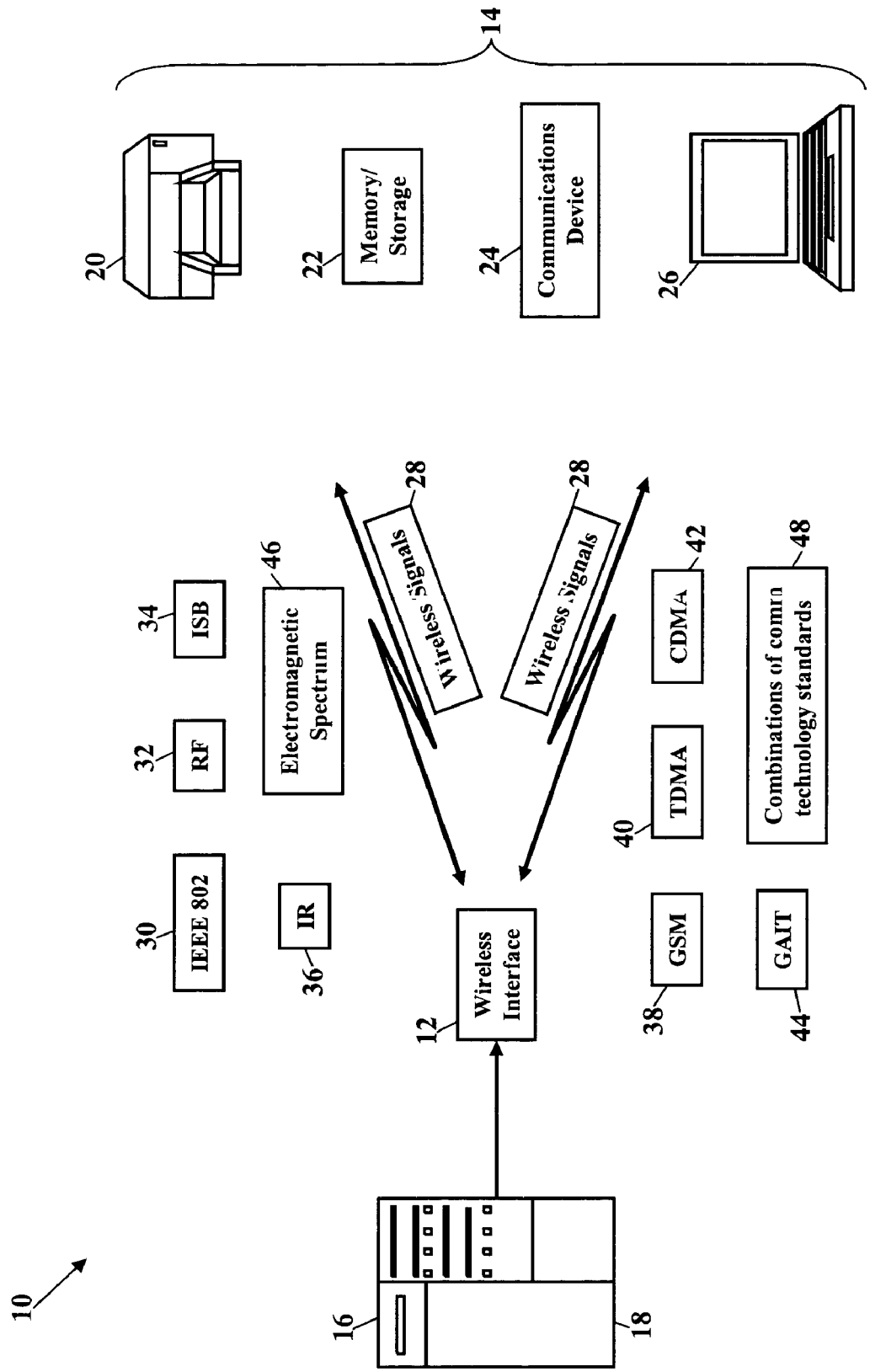
FIGS. 1-4 are schematics illustrating a wireless communications system utilizing multiple wireless technology standards, according to one of the embodiments of this invention.

FIGS. 1-4 are schematics illustrating one of the embodiments of this invention. FIG. 1 shows a wireless communications system 10. This wireless communications system 10 includes a wireless interface 12 communicating with at least one wireless peripheral device 14. The wireless interface 12 typically allows wireless communication between a computer device 16 and the at least one wireless peripheral device 14. The computer device 16 is shown as a server 18, yet the computer device 16 may be a laptop computer, a desktop computer, a personal data assistant, a communications server, or any other processor-controller computer device. The wireless peripheral device 14 may include a printer 20, a memory/storage device 22, a communications device 24, and/or a remote computer 26. The communications device 24 may include a satellite/cellular/wireless telephone, a personal digital assistant (PDA), a pager, an interactive television unit, a digital music device, a digital camera, a wireless key fob, a wireless remote control, or any other device capable of receiving wireless communications. The wireless interface 12 provides bi-directional wireless communication between the computer device 16 and the at least one wireless peripheral device 14.

The wireless interface 12 of this invention, however, may utilize more than one wireless technology standard. That is, when the wireless interface 12 arranges wireless communication with the at least one wireless peripheral device 14, the wireless interface 12 communicates using more than one wireless technology standard. As those of ordinary skill in the art understand, the at least one wireless peripheral device 14 may operate using one or more wireless technology standards. The at least one wireless peripheral device 14, for example, may operate using any of the I.E.E.E 802 family of wireless technology standards. The at least one wireless peripheral device 14 may additionally or alternatively operate using the radio frequency (RF) portion of the electromagnetic spectrum, the Industrial, Scientific, and Medical (ISM) band of the electromagnetic spectrum, the infrared (IR) portion of the electromagnetic spectrum, or any other portion/frequency within the electromagnetic spectrum. The at least one wireless peripheral device 14 may additionally or alternatively operate using a Global System for Mobile (GSM) communications technology standard, a Time Division Multiple Access (TDMA) communications technology standard, a Code Division Multiple Access (CDMA) communications technology standard, a GSM-ANSI Interoperability Team (GAIT) communications technology standard, a paging system, and/or other combinations thereof. Because the wireless interface 12 utilizes more than one wireless technology standard, the wireless interface need not know which wireless technology standard the at least one wireless peripheral device 14 requires.

FIG. 1 illustrates multiple wireless technology standards. When the computer device 16 needs to communicate with the at least one wireless peripheral device 14, the wireless interface 12 communicates wireless signals 28 utilizing more than one wireless technology standard. The wireless interface 12, for example, communicates using at least two of any wireless technology standards. FIG. 1 shows some wireless technology standards, including the I.E.E.E 802 family (Block 30), the radio frequency (RF) band (Block 32), the Industrial, Scientific, and Medical (ISM) band (Block 34), the infrared (IR) portion (Block 36), the GSM communications technology standard (Block 38), the TDMA communications technology standard (Block 40), the CDMA communications technology standard (Block 42), the GAIT communications technology standard (Block 44), any other portion/frequency of the electromagnetic spectrum (Block 46), and any combinations of communications technology standards (Block 48). The wireless signals 28, for example, are preferably transmitted throughout a TDMA wireless system, a CDMA wireless system, a GSM wireless system, and so on. The wireless signals 28, in other words, are "pseudo-broadcasted" using each wireless technology standard. While FIG. 1 only illustrates ten (10) wireless technology standards, those of ordinary skill in the art recognize that the wireless interface 12 may arrange wireless communication using more than, or less than, the ten (10) wireless technology standards shown. The wireless interface 12, in fact, may be designed to utilize any wireless technology known or developed in the future.

Figure 2:
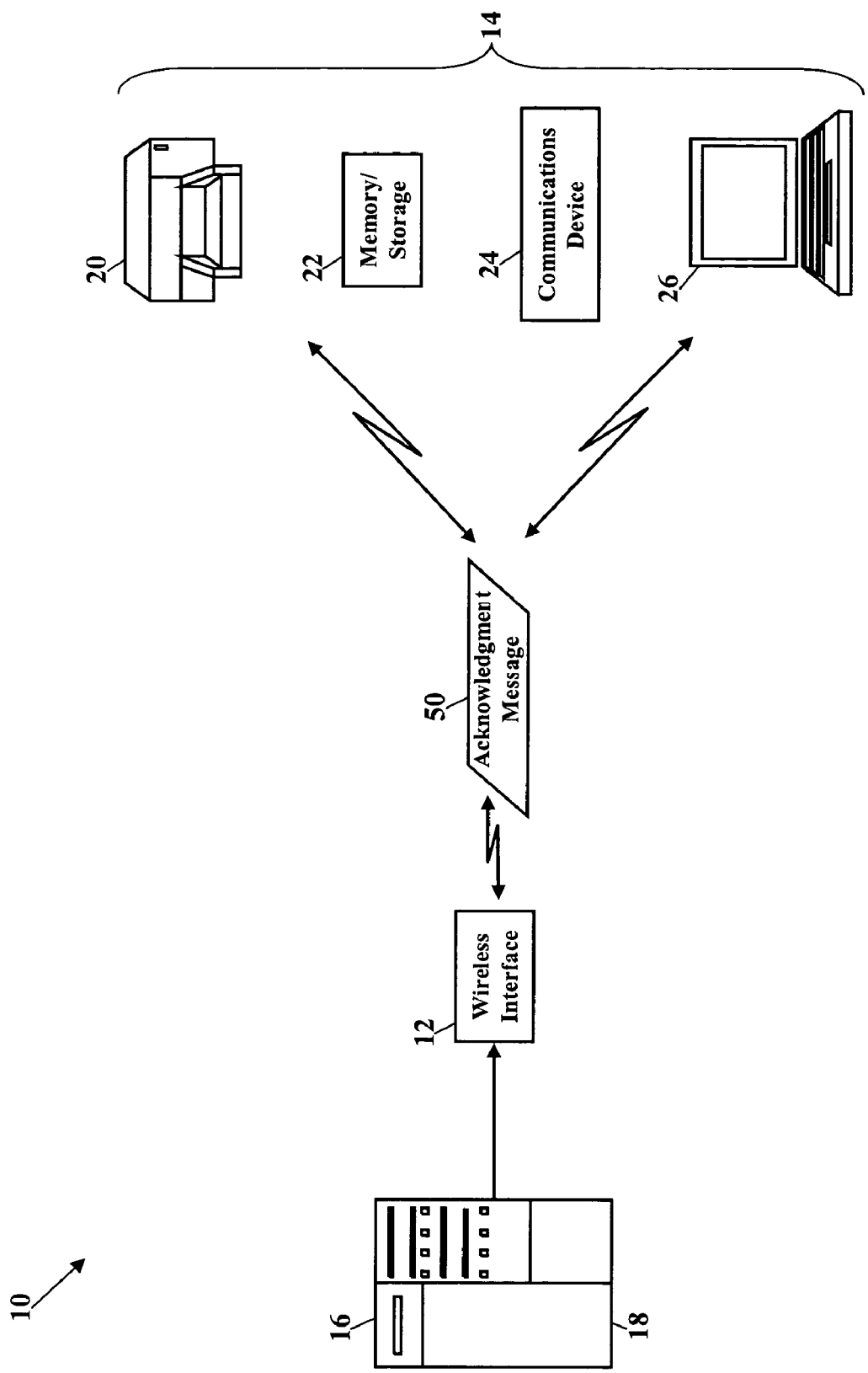

FIG. 2 shows an acknowledgement procedure. After the wireless interface 12 communicates the wireless signals (shown as reference numeral 28 in FIG. 1), the at least one wireless peripheral device 14 may return communicate an acknowledgment message 50. This acknowledgment message 50 preferably informs the wireless interface 12 of the wireless technology standard utilized by the at least one wireless peripheral device 14. Because the wireless interface 12 communicated the wireless signals utilizing more than one wireless technology standard, the acknowledgment message 50 preferably describes which wireless technology standard is preferred, and/or understood, by the at least one wireless peripheral device 14. When the wireless interface 12 receives the acknowledgment message 50, the wireless interface 12 now knows which wireless technology standard could be used for future wireless communication with that particular wireless peripheral device 14. When future communication is required with that particular wireless peripheral device 14, the wireless interface 12 utilizes the wireless technology standard identified in the acknowledgment message 50.

Figure 3:
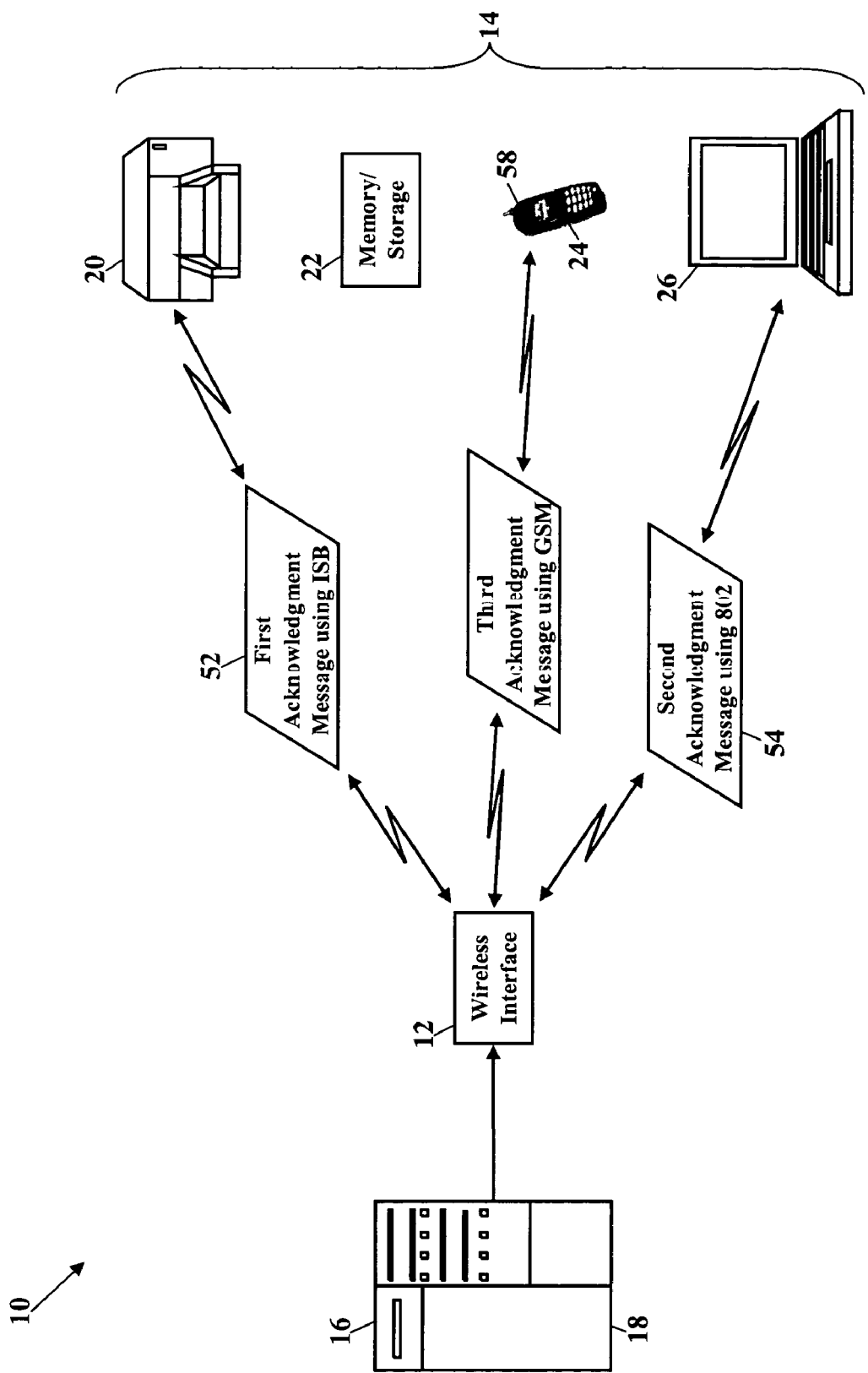

FIG. 3 illustrates multiple acknowledgements. The wireless interface 12 may communicate with more than one wireless peripheral device 14. Because the wireless interface 12 utilizes more than one wireless technology standard, the wireless interface 12 is capable of communicating with multiple wireless peripheral devices 14 using various/multiple wireless technology standards. The wireless interface 12, for example, may receive a first acknowledgment message 52 from the printer 20. FIG. 3 shows this first acknowledgment message 52 describing the Industrial, Scientific, and Medical band wireless technology standard preferred/understood by the printer 20. The wireless interface 12 may also receive a second acknowledgment message 54 from the remote computer device 26, and this second acknowledgment message 54 describes the I.E.E.E 802 wireless technology standard preferred/understood by the remote computer device 26. The wireless interface 12 may further receive a third acknowledgment message 56 from the communications device 24 (shown as a wireless telephone 58), and this third acknowledgment message 56 describes the GSM communications technology standard preferred/understood by the wireless telephone 58. While the three acknowledgment messages 52, 54, and 56 are shown, those of ordinary skill in the art now recognize that the wireless interface 12 may receive more or less acknowledgement messages. The wireless interface 12 thus uses various/multiple wireless technology standards to allow wireless communication between the computer server 18 and any of the wireless peripheral devices 14.

Figure 4:
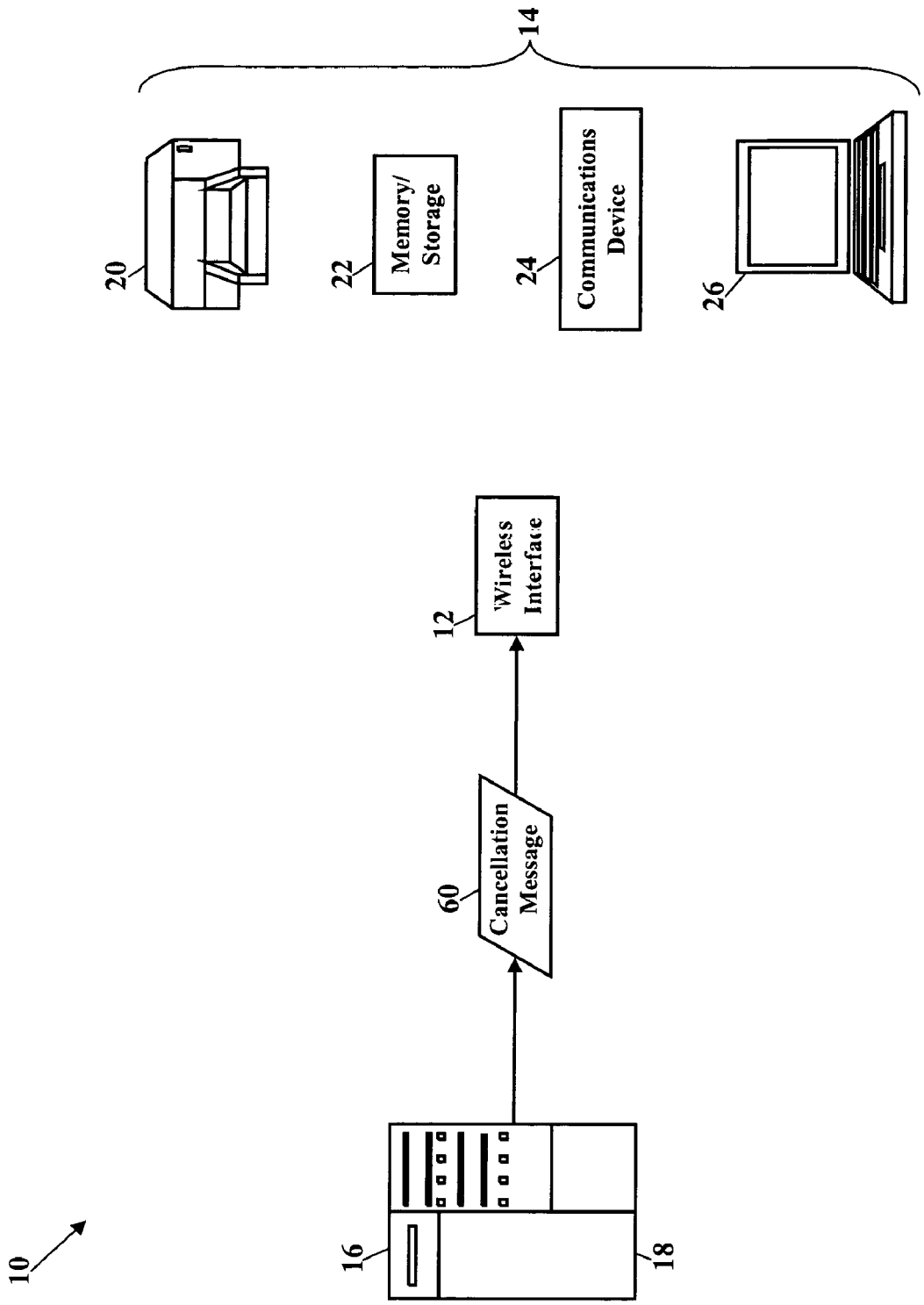

FIG. 4 illustrates a cancellation procedure. After the wireless interface 12 receives one or more of the acknowledgment messages 50, 52, 54, and 56, the wireless interface 12 may cancel, or be instructed to cancel, any unanswered wireless signals (shown as reference numeral 28 in FIG. 1). That is, the wireless interface 12 may cancel/stop communicating wireless signals using unresponsive wireless technology standards. As FIG. 3 illustrated, the wireless interface 12 received the first acknowledgment message 52 describing the Industrial, Scientific, and Medical band wireless technology standard, the second acknowledgment message 54 describing the I.E.E.E 802 wireless technology standard, and the third acknowledgment message 56 describing the GSM communications technology standard. FIG. 4, then, shows the wireless interface 12 receiving a cancellation message 60. This cancellation message 60 prevents unanswered communications signals from clogging network/device resources. The cancellation message 60, for example, instructs the wireless interface 12 to cease communicating the radio frequency (RF) band, the infrared (IR) portion, the TDMA communications technology standard, the CDMA communications technology standard, the GAIT communications technology standard, other portions/frequencies of the electromagnetic spectrum, and any combinations of communications technology standards (shown, respectively, as reference numerals 32, 36, 40, 42, 44, 46, and 48 in FIG. 1).

Figure 5:
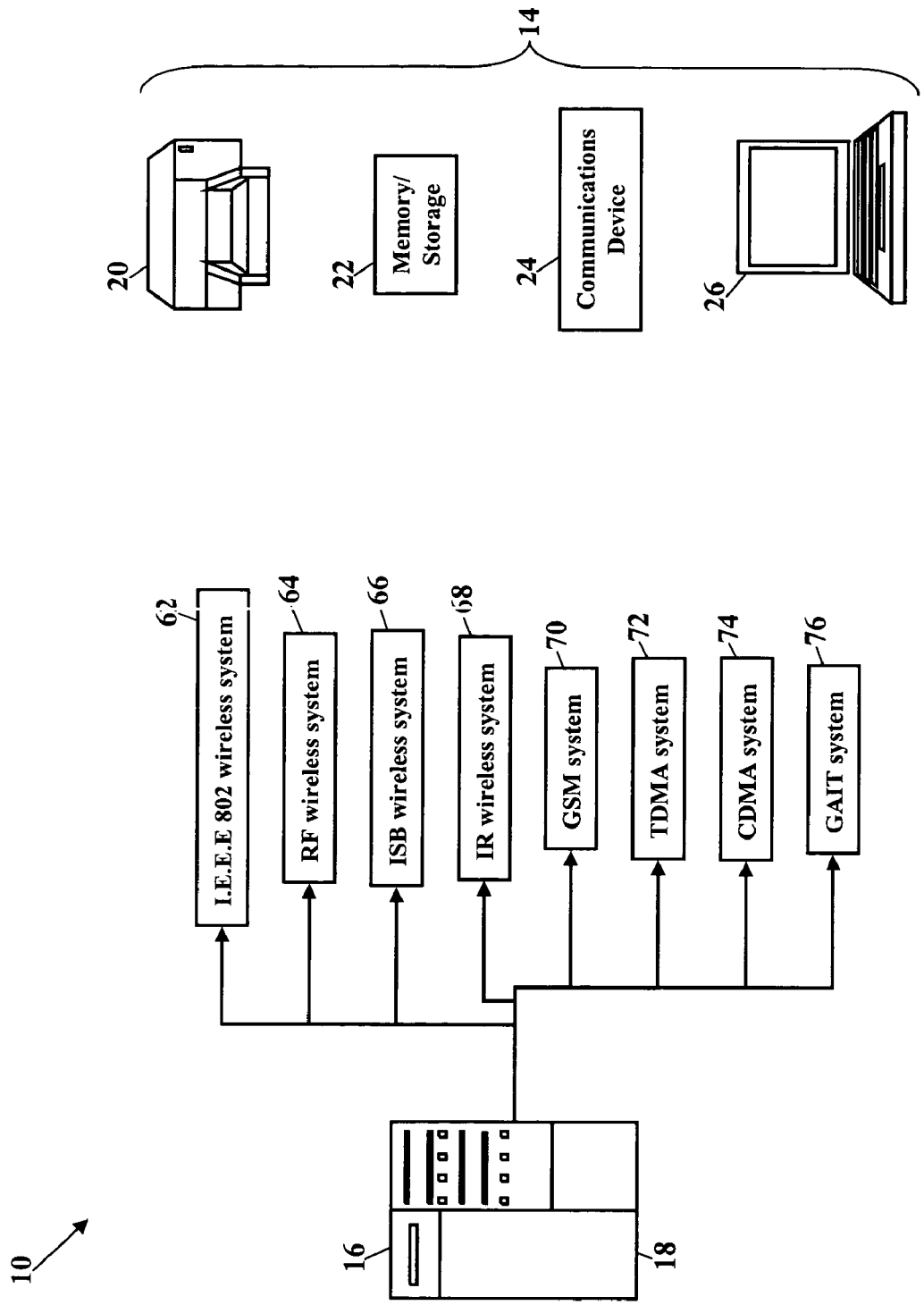
FIGS. 5-7 are schematics illustrating a wireless communications system instructing multiple wireless systems, according to another of the embodiments of this invention.
Figure 6:
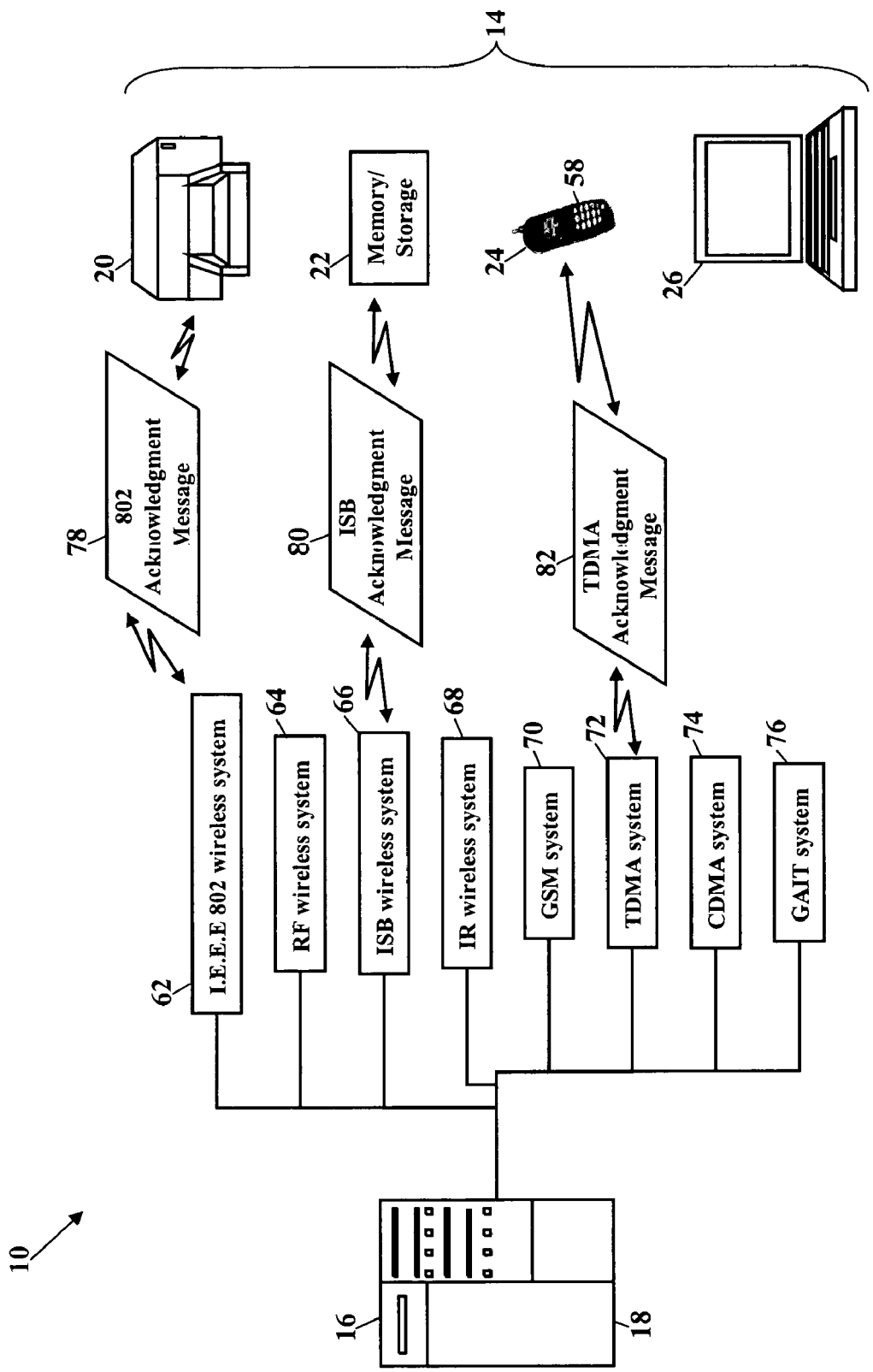
Figure 7:
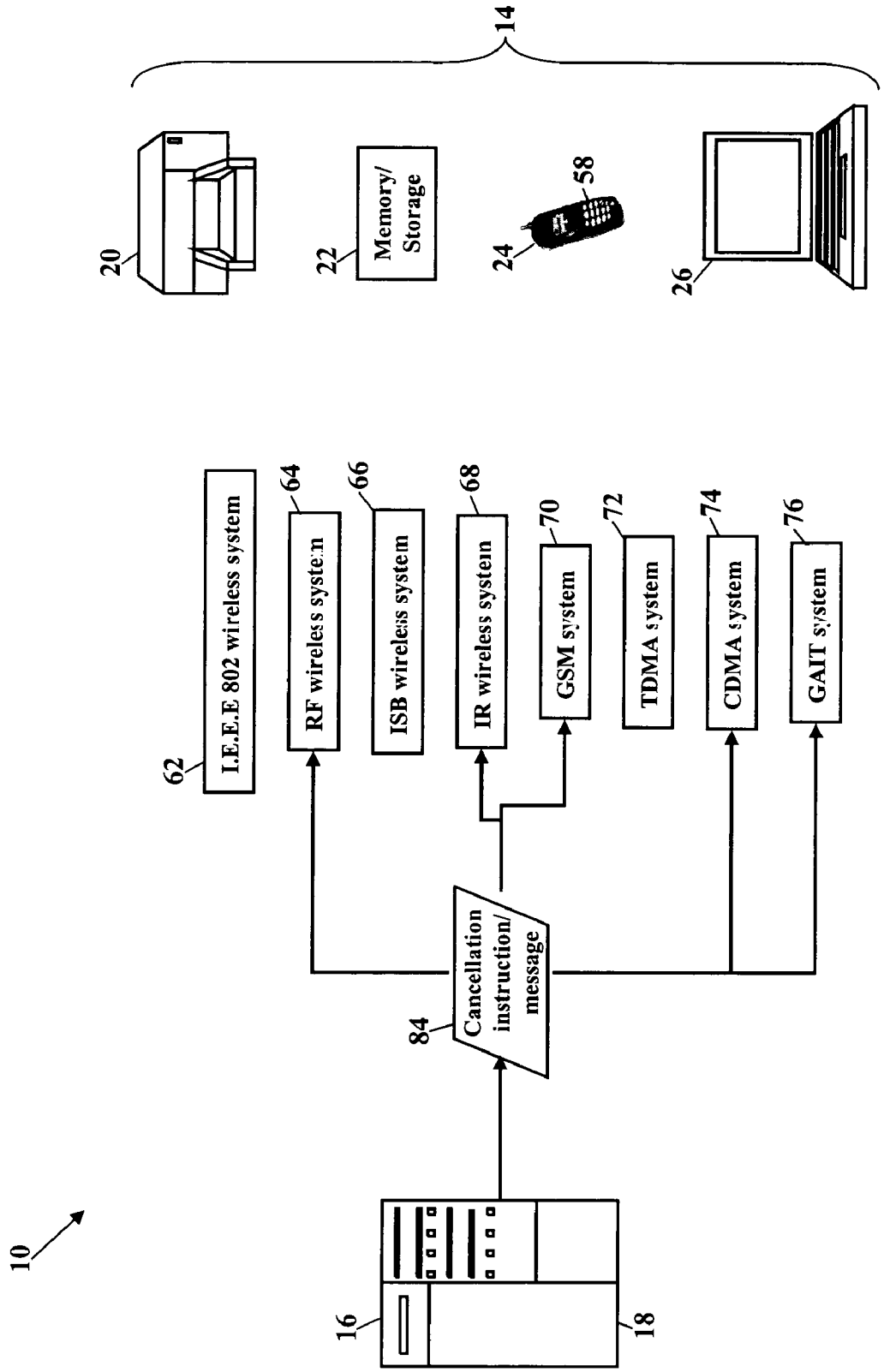

FIGS. 5-7 are schematics illustrating another of the embodiments of this invention. Here the computer device 16 (e.g., the computer server 18) instructs multiple wireless systems to communicate signals utilizing multiple wireless technology standards. The computer device 16, for example, instructs an I.E.E.E 802 wireless system 62 to initiate communication using the I.E.E.E 802 wireless technology standard. The computer device 16, similarly, may instruct a radio frequency (RF) wireless system 64, an Industrial, Scientific, and Medical band wireless system 66, and/or an infrared (IR) wireless system 68 to initiate communication using each system's respective wireless technology standard. The computer device 16, likewise, may instruct a GSM communications system 70, a TDMA communications system 72, a CDMA communications system 74, and/or a GAIT communications system 76 to initiate communication using each system's respective wireless technology standard.

FIG. 6 shows an acknowledgement procedure. After the computer server 18 instructs the multiple wireless systems to communicate registration/initialization/activation signals utilizing the multiple wireless technology standards, one or more of the wireless peripheral devices 14 return communicates an acknowledgment message. The computer server 18, for example, may receive, or be informed of, an I.E.E.E. 802 acknowledgment message 78 from the printer 20. The I.E.E.E. 802 acknowledgment message 78 describes the I.E.E.E 802 wireless technology standard preferred and/or understood by the printer 20. The computer server 18 may also receive, or be informed of, an ISM acknowledgment message 80 from the memory/storage device 22, and this ISM acknowledgment message 80 describes the ISM wireless technology standard (e.g., "Bluetooth") preferred and/or understood by the memory/storage device 22. The computer server 18 may also receive, or be informed of, a TDMA acknowledgment message 82 from the communications device 24 (shown as the wireless telephone 58), and this TDMA acknowledgment message 82 describes the TDMA communications technology standard preferred/understood by the wireless telephone 58.

FIG. 7 illustrates a cancellation procedure. After the computer server 18 receives, or is informed of, one or more of the acknowledgment messages 78, 80, and 82, the computer server 18 may instruct the unacknowledged systems to cancel transmission of any unanswered wireless signals (shown as reference numeral 28 in FIG. 1). As FIG. 7 shows, the computer server 18 sends a cancellation instruction/message 84 to each unacknowledged system. That is, the computer server 18 sends the cancellation instruction/message 84 to the radio frequency (RF) wireless system 64, the infrared (IR) wireless system 68, the GSM communications system 70, the CDMA communications system 74, and/or the GAIT communications system 76. The cancellation instruction/message 84 removes unacknowledged communications from transmission queues to reduce network traffic.

Figure 8:
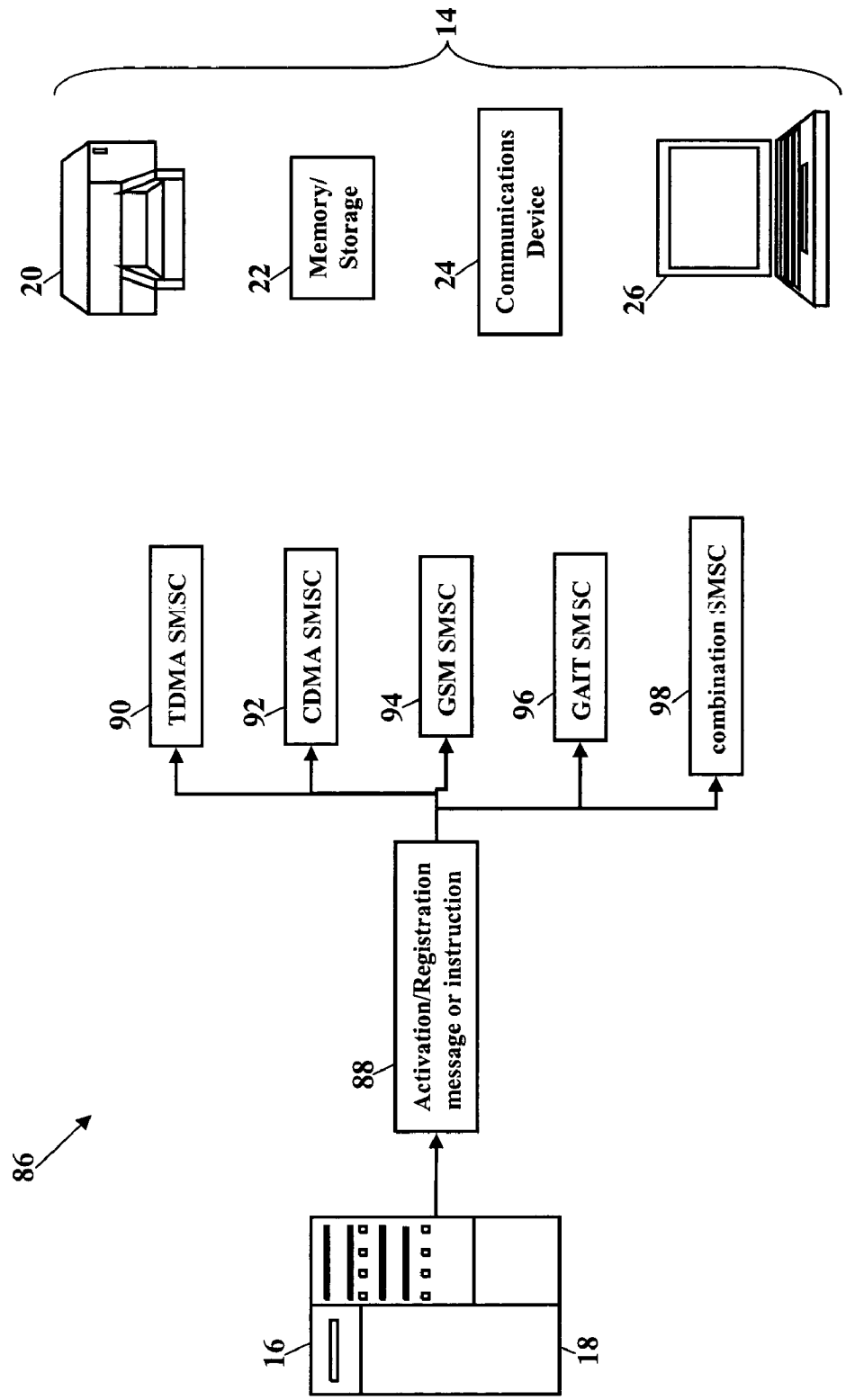
FIGS. 8 and 9 are schematics illustrating a messaging service utilizing multiple wireless technology standards, according to one of the embodiments of this invention.
Figure 9:
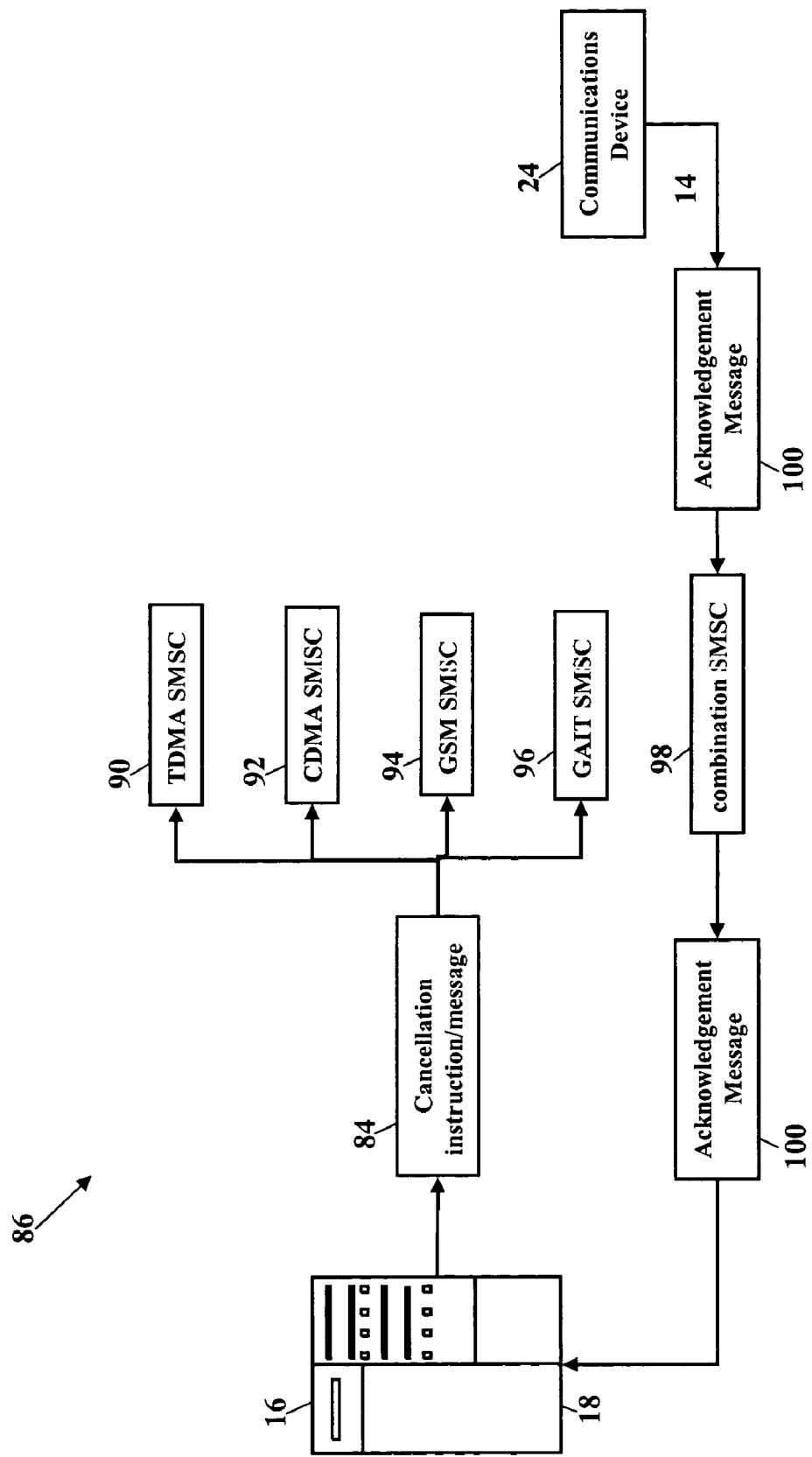

FIGS. 8 and 9 are schematics illustrating yet another of the embodiments of this invention. The techniques discussed in this patent are applicable to all types of communications, such as messages in a messaging service. As those of ordinary skill in the art recognize, the at least one peripheral device 14 may send and receive messages. These messages are composed of alphanumeric characters and are presented on a display of the at least one peripheral device 14. One such messaging service is termed a "Short Messaging Service" (SMS). The Short Messaging Service allows the transfer of files, text, graphics to and from the at least one peripheral device 14. The transferred files, text, graphics, and messages may contain instructions for activation and for registration. While messaging is a common feature or service for cellular telephones, a similar messaging service is applicable for other wireless devices and other communications devices.

FIGS. 8 and 9 show a wireless messaging system 86 utilizing multiple wireless technology standards. Here the computer server 18 issues an activation/registration message or instruction 88 to multiple wireless messaging systems. The computer server 18 issues the activation/registration message or instruction 88 to a TDMA Short Messaging Service Center (SMSC) 90, a CDMA SMSC 92, a GSM SMSC 94, a GAIT SMSC 96, and/or a combination SMSC of wireless technology standards 98 (e.g., CDMA & GSM, CDMA & TDMA). The computer server 18, although not shown, may format the activation/registration message or instruction 88 to suit the requirements of each wireless messaging system. Each wireless messaging system (e.g., the TDMA SMSC 90, the CDMA SMSC 92, the GSM SMSC 94, the GAIT SMSC 96, and/or the combination SMSC 98) then communicates the activation/registration message or instruction 88 throughout the system. The activation/registration message or instruction 88, for example, is preferably transmitted to all TDMA short message service centers, all CDMA short message service centers, all GSM short message service centers, and so on. The activation/registration message or instruction 88, in other words, is "pseudo-broadcasted" from all cells in each respective system.

FIG. 9 shows the acknowledgement and cancellation procedure. After the computer server 18 issues the activation/registration message or instruction 88 to the short message service centers 90, 92, 94, 96, and/or 98, utilizing the respective multiple wireless technology standards, one or more of the wireless peripheral devices 14 return communicates an acknowledgment message 100. The computer server 18 may then send the cancellation instruction/message 84 to each unacknowledged system to cancel transmission of any unanswered activation/registration messages. The cancellation instruction/message 84 removes unacknowledged communications from transmission queues to reduce network traffic.

This invention reduces the need to "store and forward" messages. When a message is currently communicated to the wireless peripheral device 14, the message is generally "stored and forwarded" in each of the multiple wireless technology standards. This invention, instead, waits for a successful activation. Once a successful activation is received, the network in which the wireless peripheral device 14 currently operates is now known. A flag may be set for the last known technology and/or for future logic to define future delivery algorithms. A wireless service provider may alternatively choose to "pseudo-broadcast" to all known technologies. This invention, then, reduces or even eliminates the need to create and forward the message in multiple wireless technology standards. The multiple networks are not clogged with redundant messages. This invention also reduces or even eliminates the need to cancel unsuccessfully received messages in unacknowledged networks. As 3G technologies emerge, as coverage expands, as spectrum continually narrows, and as the need to reduce costs intensifies, the need to roam and/or register utilizing multiple wireless technology standards will become more important.

Figure 10:
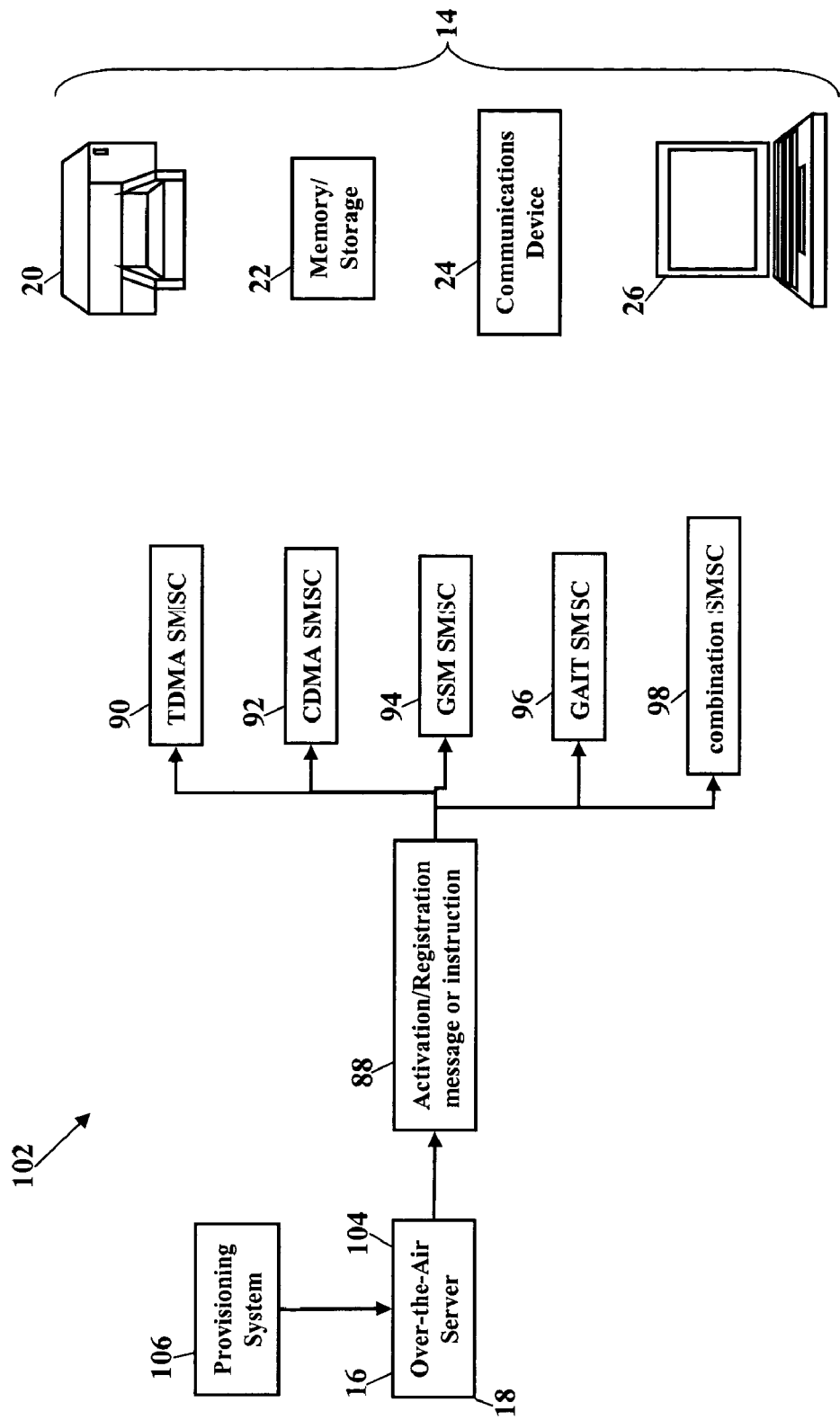
FIGS. 10 and 11 are schematics illustrating an Over-The-Air server issuing an activation/registration message or instruction to multiple wireless messaging systems, according to still more embodiments of this invention.
Figure 11:
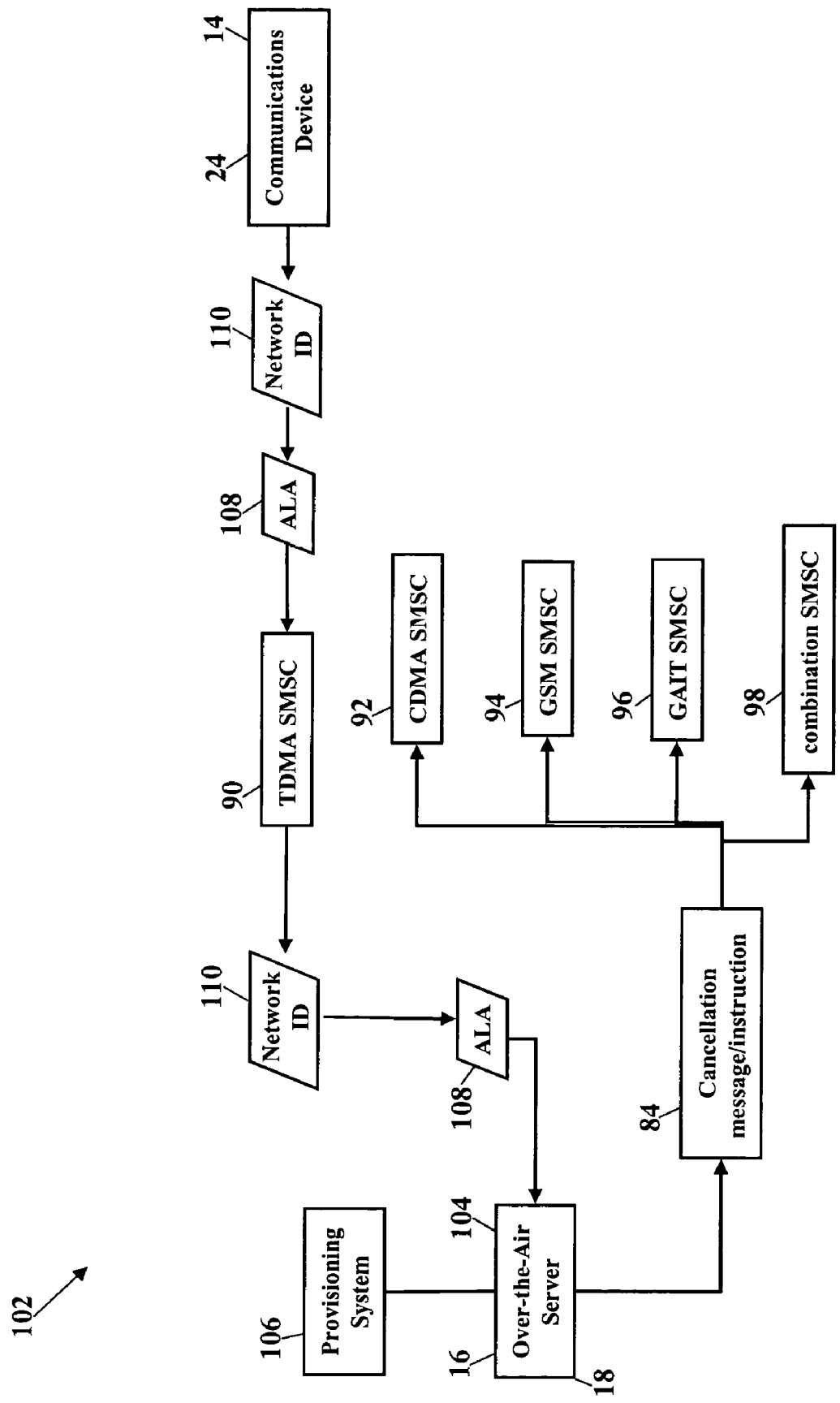

FIGS. 10 and 11 are schematics illustrating still another of the embodiments of this invention. FIGS. 10 and 11 show another wireless messaging system 102 utilizing multiple wireless technology standards. Here again the computer server 18 issues the activation/registration message or instruction 88 to multiple wireless messaging systems. The computer server 18, however, is shown as an Over-The-Air server 104. As those of ordinary skill in the art understand, the Over-The-Air server 104 is a platform that uses an industry standard for the transmission and reception of application-related information in the wireless messaging system 102. The Over-The-Air server 104 is commonly used in the Short Messaging Service (SMS). The Over-The-Air server 104, then, issues the activation/registration message or instruction 88 to multiple wireless messaging systems.

Here a provisioning system 106 instructs the Over-The-Air server 104 to initiate the activation/registration message or instruction 88. The Over-The-Air server 104 issues the activation/registration message or instruction 88 to the TDMA SMSC 90, the CDMA SMSC 92, the GSM SMSC 94, the GAIT SMSC 96, and/or the combination SMSC 98. The Over-The-Air server 104 thus acts as a multiple wireless technology device management system. Each wireless messaging system (e.g., the TDMA SMSC 90, the CDMA SMSC 92, the GSM SMSC 94, the GAIT SMSC 96, and/or the combination SMSC 98) then "pseudo-broadcasts" the activation/registration message or instruction 88 from all cells throughout the respective system. As those of ordinary skill in the art now understand, the "store-and-forward" platform in each wireless messaging system delivers the activation/registration message or instruction 88 across each respective network.

FIG. 11 shows the acknowledgement and cancellation procedure. After the Over-The-Air server 104 issues the activation/registration message or instruction 88 to the short message service centers 90, 92, 94, 96, and/or 98, utilizing the respective multiple wireless technology standards, one or more of the wireless peripheral devices 14 return communicates an Application Layer Acknowledgment (ALA) message 108. As those of ordinary skill in the art understand, the Application Layer Acknowledgment message 108 is a response sent by the wireless peripheral device 14. The Application Layer Acknowledgment message 108 informs the short message service center (such as the TDMA SMSC 90) that the wireless peripheral device 14 received and processed the activation/registration message or instruction (shown as reference numeral 88 in FIG. 10). The Application Layer Acknowledgment message 108 confirms that the wireless peripheral device 14 was successfully reprogrammed with an application. The Application Layer Acknowledgment message 108 also does not "block" the Over-The-Air server 104 from provisioning other wireless peripheral devices. The Application Layer Acknowledgment message 108 may also contain a network identification (ID) 110. The network identification 110 identifies the wireless technology standard preferred, understood, or currently used by the wireless peripheral device 14. As FIG. 11 indicates, because the TDMA SMSC 90 received the Application Layer Acknowledgment message 108 from the wireless peripheral device 14, the network identification 110 could indicate a TDMA wireless technology standard that is currently being used or recognized by the wireless peripheral device 14. Once the wireless peripheral device 14 is located, the provisioning system 106 activates/registers the wireless peripheral device 14. Any messages (not shown) may now be delivered, or "terminated," to the wireless peripheral device 14. The process of activation/registration, however, is well-known in the art, so this patent will not further discuss activation/registration of the wireless peripheral device 14. If, however, the reader desires more information on the activation/registration process, the reader is directed to the following sources: LAWRENCE HARTE et al., GSM SUPERPHONES 150-52 & 170-73 (1999); JÖRG EBERSPÄCHER et al., GSM SWITCHING, SERVICES AND PROTOCOLS 40 (2001); and JOACHIM TISAL, GSM CELLULAR RADIO TELEPHONY 80-83 (1997), with each incorporated herein by reference.

Now that wireless peripheral device 14 is located, unacknowledged messages are cancelled. As FIG. 11 also shows, the Over-The-Air server 104 sends the cancellation instruction/message 84 to each unacknowledged SMSC system. The cancellation instruction/message 84 instructs each respective SMSC system to cancel transmission of any unanswered activation/registration messages. The cancellation instruction/message 84 removes unacknowledged communications from transmission queues to reduce network traffic.

The teachings of this patent may be applied to a "world" communications device. As a subscriber travels throughout the world, a single "world" communications device is a desirable advancement. This "world" communications device would operate in most (if not all) regions of the world. This "world" communications device, for example, could be a true "tri-mode" communications device that operates using the TDMA, CDMA, and GSM wireless technology standards. No matter in what country the subscriber travels, the subscriber's "world" communications device would operate to send and receive communications.

Figure 12:
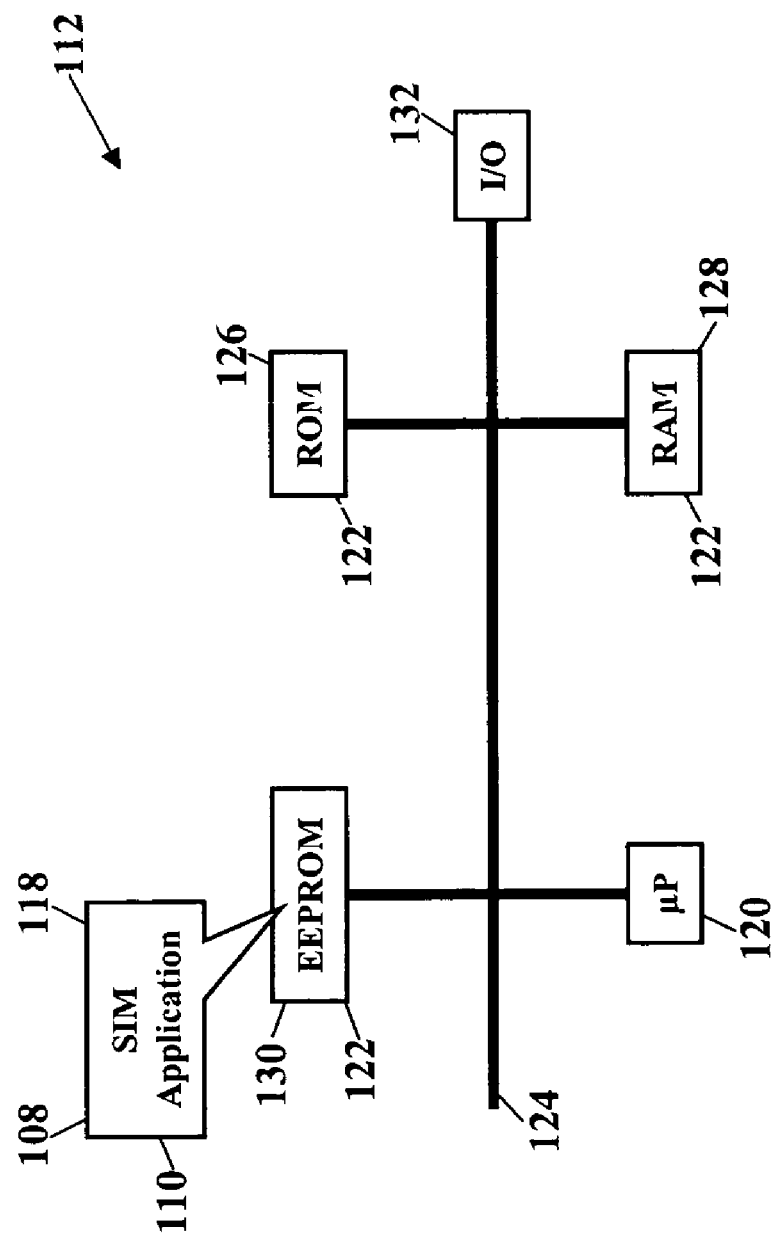
FIGS. 12-14 are schematics illustrating a "world" communications device according to more embodiments of this invention.
Figure 14:
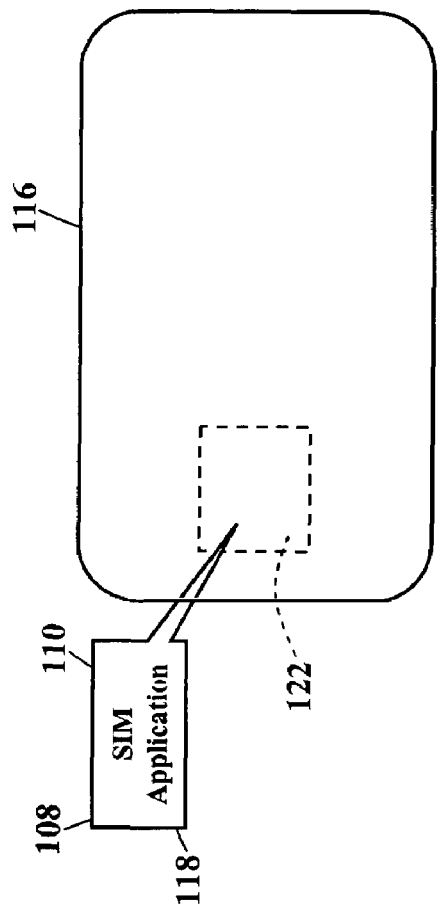
Figure 13:
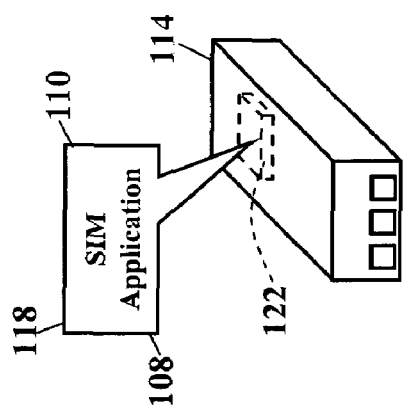

FIGS. 12-14 are schematics illustrating this "world" communications device according to even more embodiments of this invention. FIGS. 12-14, in fact, illustrate some componentry of the peripheral devices (shown as reference numeral 14 in FIGS. 1-11). This "world" communications device could communicate the Application Layer Acknowledgment message 108. FIG. 12 is a block diagram of a Subscriber Identity Module 112, while FIGS. 13 and 14 illustrate, respectively, the Subscriber Identity Module 112 embodied in a plug 114 and the Subscriber Identity Module 112 embodied in a card 116. As those of ordinary skill in the art recognize, the Subscriber Identity Module 112 stores user information (such as the user's International Mobile Subscriber Identity, the user's $K_i$ number, and other user information) and a Subscriber Identity Module application 118. This "world" communications device communicates the Application Layer Acknowledgment message 108 to acknowledge a successful reprogramming of Subscriber Identity Module application 118. As those of ordinary skill in the art also recognize, the plug 114 and the card 116 each interface with the wireless peripheral device (shown as reference numeral 14 in FIGS. 1-11) according to GSM Standards 2.17 and 11.11 and ISO Standard 7816, with each incorporated herein by reference. The GSM Standard 2.17 is formally known as "European digital cellular telecommunications system (Phase 1); Subscriber Identity Modules, Functional Characteristics (GSM 02.17 V3.2.0 (1995-01))." The GSM Standard 11.11 is formally known as "Digital cellular telecommunications system (Phase 2+) (GSM); Specification of the Subscriber Identity Module—Mobile Equipment (Subscriber Identity Module—ME) interface (GSM 11.11 V5.3.0 (1996-07))." Both GSM standards are available from the European Telecommunication Standards Institute (650 route des Lucioles, 06921 Sophia-Antipolis Cedex, FRANCE, Tel.: +33 (0)4 92 94 42 00, Fax: +33 (0)4 93 65 47 16, www.etsi.org). The ISO Standard 7816 is formally known as "Information technology—Identification cards—Integrated circuit(s) cards with contacts," and the standard is available from the International Organization for Standardization (ISO) (1, rue de Varembé, Case, postale 56CH-1211 Geneva 20, Switzerland, Telephone +41 22 749 01 11, Telefax +41 22 733 34 30, www.iso.org).

FIG. 12 is a block diagram of the Subscriber Identity Module 112, whether embodied as the plug 114 of FIG. 13 or as the card 116 of FIG. 14. Here the Subscriber Identity Module 112 comprises a microprocessor 120 (μP) communicating with memory modules 122 via a data bus 124. The memory modules may include Read Only Memory (ROM) 126, Random Access Memory (RAM) and or flash memory 128, and Electrically Erasable-Programmable Read Only Memory (EEPROM) 130. The Subscriber Identity Module 112 stores the Subscriber Identity Module application 118 in one or more of the memory modules 122. FIG. 12 shows the Subscriber Identity Module application 118 residing in the Erasable-Programmable Read Only Memory 130, yet the Subscriber Identity Module application 118 could alternatively or additionally reside in the Read Only Memory 126 and/or the Random Access/Flash Memory 128. An Input/Output module 132 handles communication between the Subscriber Identity Module 112 and the wireless peripheral device. Because Subscriber Identity Modules are well known in the art, this patent will not further discuss the operation and the physical/memory structure of the Subscriber Identity Module 112. If, however, the reader desires more information on the Subscriber Identity Module, the reader is directed to the following sources: LAWRENCE HARTE et al., GSM SUPERPHONES 99-100, 113-14 (1999); SIEGMUND REDL et al., GSM AND PERSONAL COMMUNICATIONS HANDBOOK 303-69 (1998); and JOACHIM TISAL, GSM CELLULAR RADIO TELEPHONY 99-130 (1997), with each incorporated herein by reference.

The Subscriber Identity Module application 118 comprises the Application Layer Acknowledgment message 108. The Application Layer Acknowledgment message 108 informs the short message service center (such as the TDMA SMSC 90 shown in FIG. 11) that the wireless peripheral device received and processed the activation/registration message or instruction (shown as reference numeral 88 in FIG. 10). The Application Layer Acknowledgment message 108 is communicated from the wireless peripheral device to acknowledge a successful reprogramming of the Subscriber Identity Module application 118. The Application Layer Acknowledgment message 108 may also contain the network identification (ID) 110. The network identification 110 identifies the wireless technology standard preferred, understood, or currently used by the wireless peripheral device.

Figure 15:
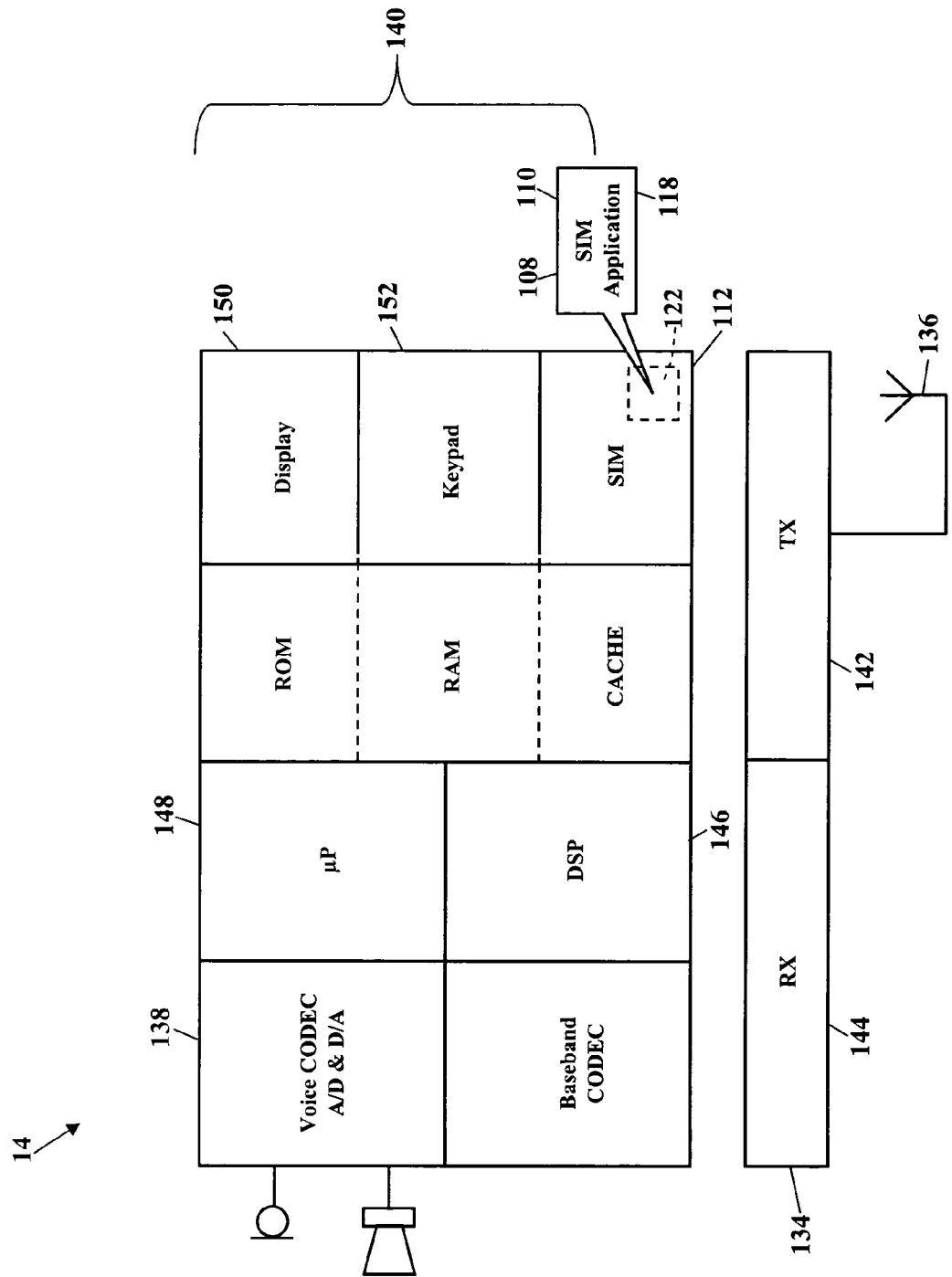
FIG. 15 is a schematic illustrating an apparatus for activation and registration according to still more embodiments of this invention.

FIG. 15 is a schematic illustrating yet another apparatus for activation and registration according to even more embodiments of this invention. FIG. 15 is a block diagram of the wireless peripheral device 14 utilizing the Application Layer Acknowledgment message 108 of this invention. Here the wireless peripheral device 14 comprises a radio transceiver unit 134, an antenna 136, a digital baseband chipset 138, and a man/machine interface (MMI) 140. The transceiver unit 134 includes transmitter circuitry 142 and receiver circuitry 144 for receiving and transmitting electromagnetic signals. The transceiver unit 134 couples to the antenna 136 for converting electrical current to and from electromagnetic waves. The digital baseband chipset 138 contains a digital signal processor (DSP) 146 and performs signal processing functions for electromagnetic signals. As FIG. 15 shows, the digital baseband chipset 138 may also include an on-board microprocessor 148 that interacts with the man/machine interface (MMI) 140. The man/machine interface (MMI) 140 may comprise a display device 150, a keypad 152, and the Subscriber Identity Module 112. The on-board microprocessor 148 performs protocol functions and control functions for the radio circuitry 142 and 144, for the display device 150, and for the keypad 152. The on-board microprocessor 148 may also interface with the Subscriber Identity Module 112 and with the Subscriber Identity Module application 118 residing in the memory module 122 of the Subscriber Identity Module 112. The Subscriber Identity Module 112 executes the Subscriber Identity Module application 118, and the Subscriber Identity Module application 118 includes the Application Layer Acknowledgment message 108 of this invention. The Application Layer Acknowledgment message 108 informs the short message service center (such as the TDMA SMSC 90 shown in FIG. 11) that the wireless peripheral device received and processed the activation/registration message or instruction (shown as reference numeral 88 in FIG. 10). Because the basic, functional architecture of the wireless peripheral device 14 is well known to those of ordinary skill in the art, the wireless peripheral device 14 will not be further discussed. If the reader desires a more detailed explanation, the reader is invited to consult the following sources: LAWRENCE HARTE et al., GSM SUPERPHONES 105-120 (1999); SIEGMUND REDL et al., GSM AND PERSONAL COMMUNICATIONS HANDBOOK 389-474 (1998); and JOACHIM TISAL, GSM CELLULAR RADIO TELEPHONY 99-130 (1997), with each incorporated herein by reference.

Figure 16:
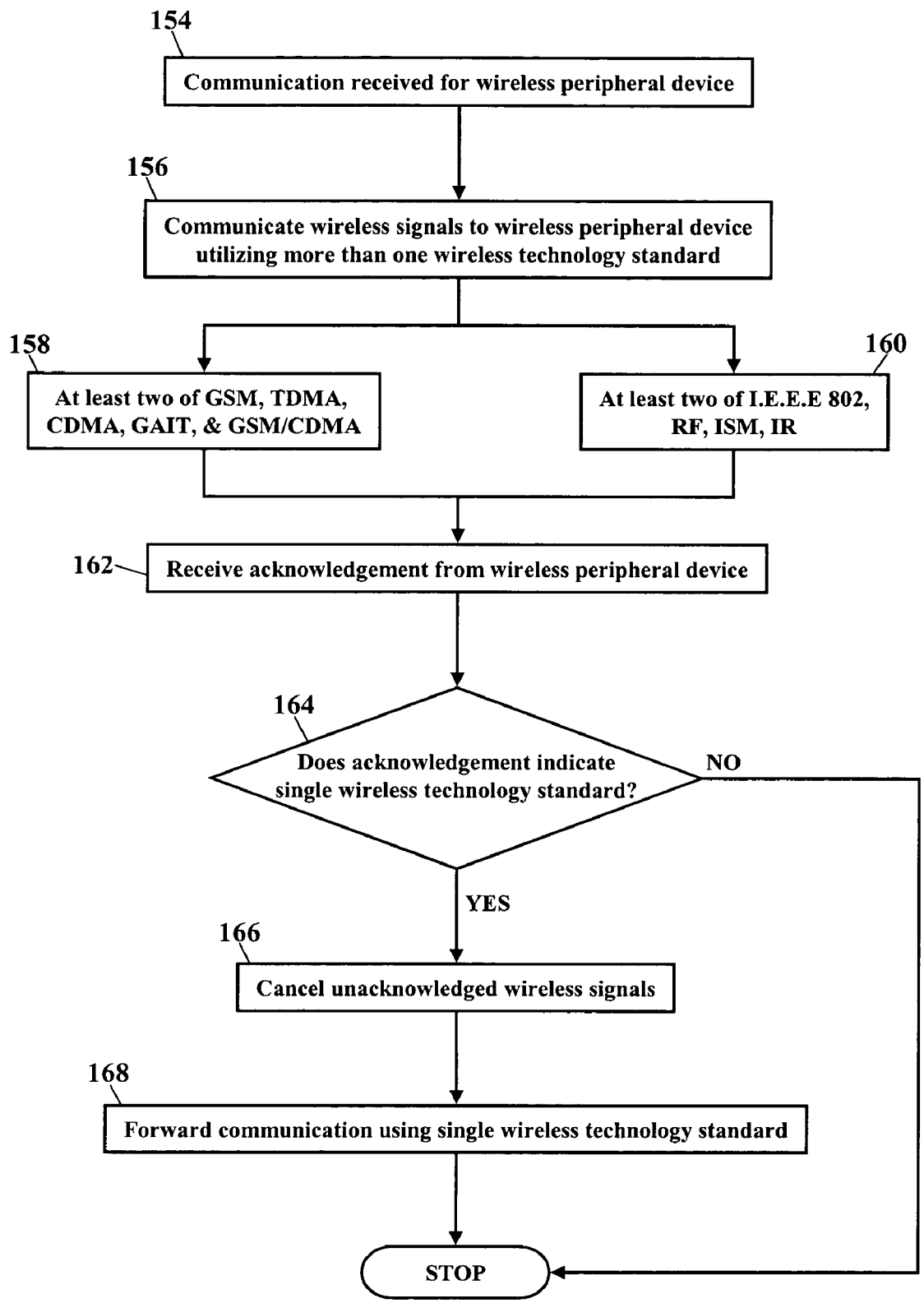
FIG. 16 is a flowchart illustrating a method of communicating with a wireless peripheral device, according to the embodiments of this invention.

FIG. 16 is a flowchart illustrating a method of communicating with a wireless peripheral device. The wireless peripheral device may include a printer, a memory/storage device, a communications device, and/or a computer. The communications device may include a satellite/cellular/wireless telephone, a personal digital assistant (PDA), a pager, an interactive television unit, a digital music device, a digital camera, a wireless key fob, a wireless remote control, or any other device capable of receiving wireless communications. A communication is received for the wireless peripheral device (Block 154). The communication may be a telephone call or an electronic communication, such as an email, a text message, or a page. The electronic communication may include an attachment, such as a computer file, photo, or computer application. Wireless signals are communicated to the wireless peripheral device, and the wireless signals utilize more than one wireless technology standard (Block 156). The wireless signals are communicated using at least two of i) a Global System for Mobile (GSM) communications technology standard, ii) a Time Division Multiple Access (TDMA) communications technology standard, iii) a Code Division Multiple Access (CDMA) communications technology standard, iv) a GSM-ANSI Interoperability Team (GAIT) communications technology standard, and v) a combination of the Global System for Mobile (GSM) communications technology standard and the Code Division Multiple Access (CDMA) communications technology standard (Block 158). The wireless signals may additionally or alternatively be communicated using at least two of i) an I.E.E.E 802 wireless technology standard, ii) a radio frequency (RF) portion of the electromagnetic spectrum, iii) an Industrial, Scientific, and Medical (ISM) band of the electromagnetic spectrum, and iv) an infrared (IR) portion of the electromagnetic spectrum (Block 160). An acknowledgement is received from the wireless peripheral device (Block 162). If the acknowledgement indicates a single wireless technology standard utilized by the wireless peripheral device (Block 164), then unacknowledged wireless signals are cancelled (Block 166). The communication is then forwarded to the wireless peripheral device using the single wireless technology standard (Block 168).

Figure 17:
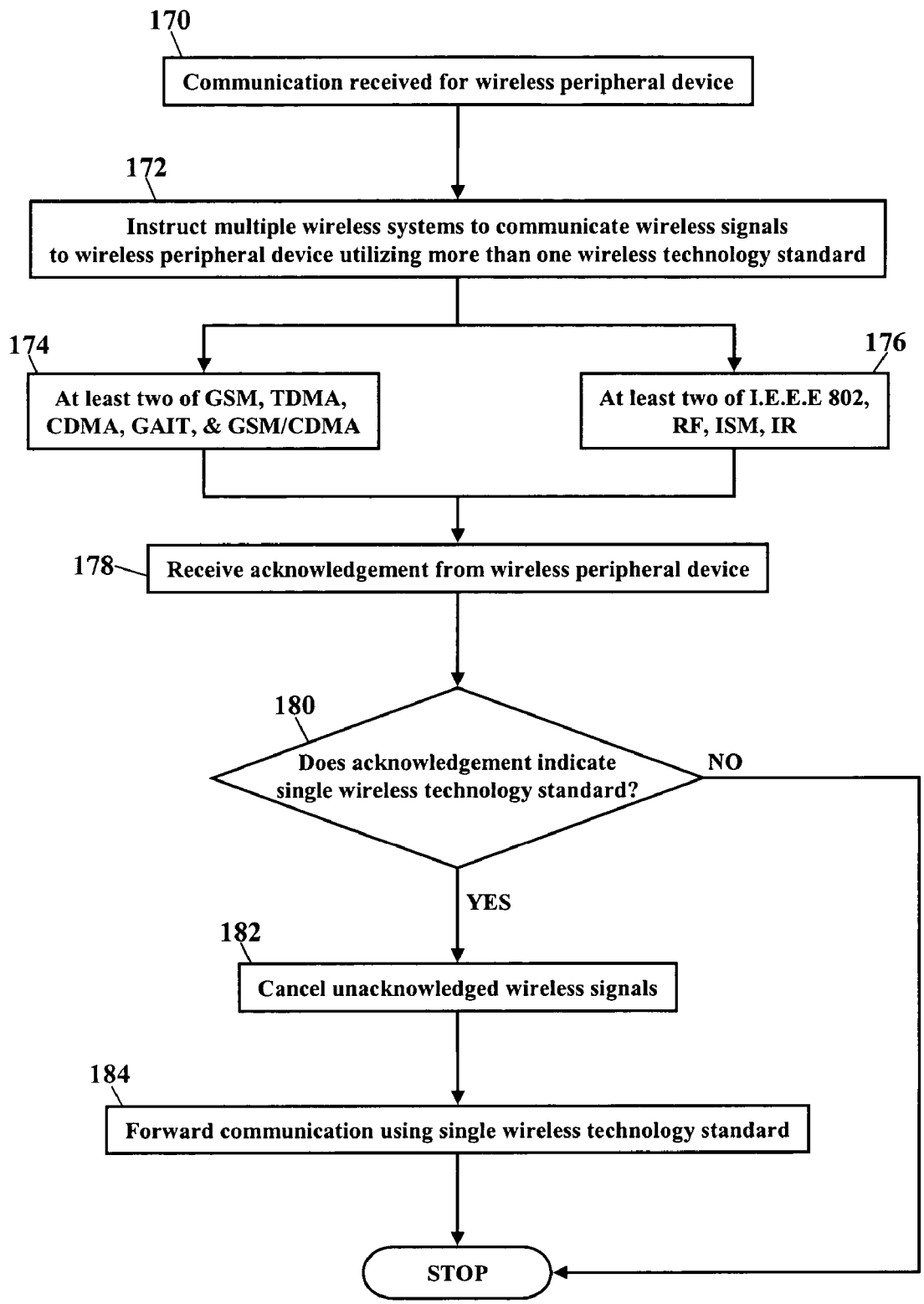
FIG. 17 is a flowchart illustrating another method of communicating with a wireless peripheral device, according to more embodiments of this invention.

FIG. 17 is a flowchart illustrating another method of communicating with a wireless peripheral device. A communication is received for the wireless peripheral device (Block 170). Multiple wireless systems are instructed to communicate wireless signals to the wireless peripheral device, and the multiple wireless systems utilize multiple wireless technology standards (Block 172). The wireless signals are communicated using at least two of i) a Global System for Mobile (GSM) communications system, ii) a Time Division Multiple Access (TDMA) communications system, iii) a Code Division Multiple Access (CDMA) communications system, iv) a GSM-ANSI Interoperability Team (GAIT) communications system, and v) a combination of the Global System for Mobile (GSM) communications technology standard and the Code Division Multiple Access (CDMA) communications system (Block 174). The wireless signals may additionally or alternatively be communicated using at least two of i) an I.E.E.E 802 wireless system, ii) a radio frequency (RF) wireless system, iii) an Industrial, Scientific, and Medical (ISM) wireless system, and iv) an infrared (IR) wireless system (Block 176). An acknowledgement is received from the wireless peripheral device (Block 178). If the acknowledgement indicates a single wireless technology standard utilized by the wireless peripheral device (Block 180), then unacknowledged wireless signals are cancelled (Block 182). The communication is then forwarded to the wireless peripheral device using the single wireless technology standard (Block 184).

Figure 18:
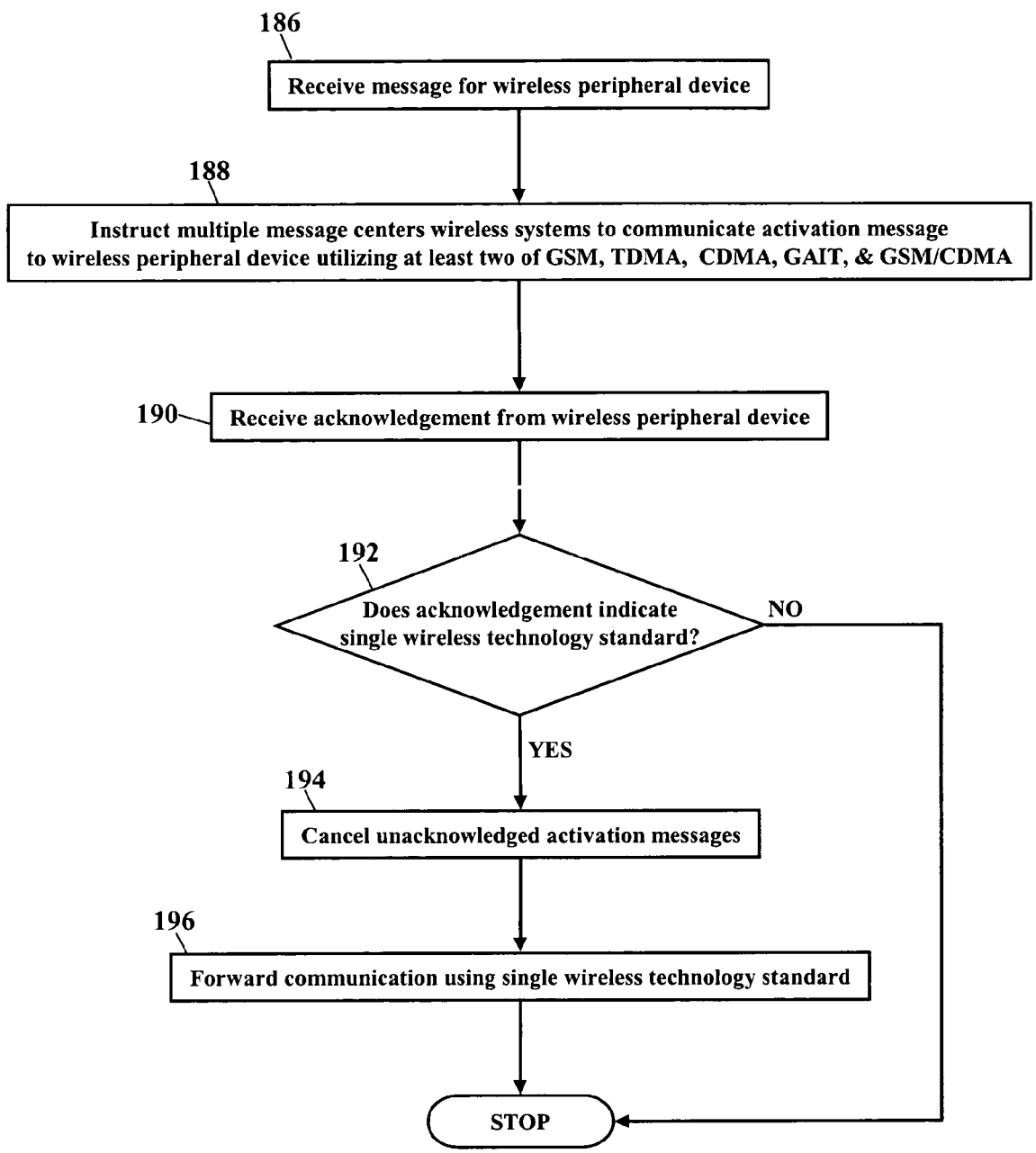
FIG. 18 is a flowchart illustrating a method for terminating a message to a wireless peripheral device, according to even more embodiments of this invention.

FIG. 18 is a flowchart illustrating a method for terminating a message to a wireless peripheral device. The message is received for the wireless peripheral device (Block 186). Multiple message service centers are instructed to communicate an activation message to the wireless peripheral device utilizing at least two of i) a Global System for Mobile (GSM) communications technology standard, ii) a Time Division Multiple Access (TDMA) communications technology standard, iii) a Code Division Multiple Access (CDMA) communications technology standard, iv) a GSM-ANSI Interoperability Team (GAIT) communications technology standard, and v) a combination of the Global System for Mobile (GSM) communications technology standard and the Code Division Multiple Access (CDMA) communications technology standard (Block 188). An acknowledgement is received from the wireless peripheral device (Block 190). If the acknowledgement indicates a single wireless technology standard utilized by the wireless peripheral device (Block 192), then unacknowledged activation messages are cancelled (Block 194). The communication is then forwarded to the wireless peripheral device using the single wireless technology standard (Block 184).

While this invention has been described with respect to various features, aspects, and embodiments, those skilled and unskilled in the art will recognize the invention is not so limited. Other variations, modifications, and alternative embodiments may be made without departing from the spirit and scope of this invention.

What is claimed is:

1. A method, comprising the steps of:
    receiving a communication for a wireless peripheral device;
    communicating wireless signals in a plurality of wireless technology standards at the same time to the wireless peripheral device;
    identifying a single wireless technology standard utilized by the wireless peripheral device; and
    forwarding the communication to the wireless peripheral device using a single wireless technology standard.

2. A method according to claim 1, wherein the step of identifying further comprises receiving an acknowledgement from the wireless peripheral device, the acknowledgement indicating the single wireless technology standard utilized by the wireless peripheral device.

3. A method according to claim 1, wherein step of communicating the wireless signals comprises wirelessly communicating the wireless signals using at least two of i) a Global System for Mobile (GSM) communications technology standard, ii) a Time Division Multiple Access (TDMA) communications technology standard, iii) a Code Division Multiple Access (CDMA) communications technology standard, iv) a GSM-ANSI Interoperability Team (GAIT) communications technology standard, and v) a combination of the Global System for Mobile (GSM) communications technology standard and the Code Division Multiple Access (CDMA) communications technology standard.

4. A method according to claim 1, wherein step of communicating the wireless signals comprises wirelessly communicating the wireless signals using at least two of i) an I.E.E.E 802 wireless technology standard, ii) a radio frequency (RF) portion of the electromagnetic spectrum, iii) an Industrial, Scientific, and Medical (ISM) band of the electromagnetic spectrum, and iv) an infrared (IR) portion of the electromagnetic spectrum.

5. A method for communicating with a wireless peripheral device, the method comprising:
    receiving a communication for the wireless peripheral device;
    instructing multiple wireless systems to communicate wireless signals to the wireless peripheral device, the multiple wireless systems utilizing multiple wireless technology standards at the same time for communicating;
    identifying a single wireless technology standard utilized by the wireless peripheral device; and
    forwarding the communication to the wireless peripheral device using the single wireless technology standard.

6. A method according to claim 5, wherein step of instructing the multiple wireless systems to communicate the wireless signals comprises instructing at least two of i) a Global System for Mobile (GSM) communications system, ii) a Time Division Multiple Access (TDMA) communications system, iii) a Code Division Multiple Access (CDMA) communications system, iv) a GSM-ANSI Interoperability Team (GAIT) communications system, and v) a combination of the Global System for Mobile (GSM) communications technology standard and the Code Division Multiple Access (CDMA) communications system.

7. A method according to claim 5, wherein step of instructing the multiple wireless systems to communicate the wireless signals comprises instructing at least two of i) an I.E.E.E 802 wireless system, ii) a radio frequency (RF) wireless system, iii) an Industrial, Scientific, and Medical (ISM) wireless system, and iv) an infrared (IR) wireless system.

8. A method for terminating a message to a wireless peripheral device, the method comprising:
    receiving the message for the wireless peripheral device;
    instructing multiple message service centers to communicate an activation message to the wireless peripheral device, the multiple message service centers utilizing at least two of i) a Global System for Mobile (GSM) communications technology standard, ii) a Time Division Multiple Access (TDMA) communications technology standard, iii) a Code Division Multiple Access (CDMA) communications technology standard, iv) a GSM-ANSI Interoperability Team (GAIT) communications technology standard, and v) a combination of the Global System for Mobile (GSM) communications technology standard and the Code Division Multiple Access (CDMA) communications technology standard, at the same time for communicating; and forwarding the communication to the wireless peripheral device using a single wireless technology standard identified as being utilized by the wireless peripheral device.

9. A method according to claim 8, further comprising receiving an acknowledgement from the wireless peripheral device, the acknowledgement indicating the single wireless technology standard identified as being utilized by the wireless peripheral device.

10. A method according to claim 5, wherein the step of identifying further comprises receiving an acknowledgement from the wireless peripheral device, the acknowledgement indicating the single wireless technology standard utilized by the wireless peripheral device.

* * * * *